UNITED STATES PATENT OFFICE.

HENRY SPENCER BLACKMORE, OF MOUNT VERNON, NEW YORK.

PROCESS OF REDUCING METALS AND PRODUCING ALLOYS THEREOF.

SPECIFICATION forming part of Letters Patent No. 699,282, dated May 6, 1902.

Application filed February 14, 1900. Renewed March 15, 1901. Serial No. 51,390. (No specimens.)

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Reducing Metals and Producing Alloys Thereof; and I do hereby declare the following to be a full, clear, and exact description of the invention, such as will enable others skilled in the art to which it appertains to make and use the same.

The object of my invention is to reduce aluminium and other metals from their ores or combinations in a rapid, economical, and efficient manner; and it consists in exposing metallic compounds or combinations containing two or more non-metallic elements, one of which is oxygen, to the combined action of the elements of a metallic carbid in a heated condition.

My invention relates particularly to the reduction of aluminium from its ores or combinations, but is applicable to other metals and is therefore not limited to the same.

As an illustration of my invention as practically carried out I will describe the reduction of aluminium from its oxyfluorid or mixture of aluminium fluorid and oxid, which may be considered its described equivalent from a reducing standpoint, as the union thereof on heating produces a compound containing fluorin and oxygen combined with aluminium.

The aluminium oxyfluorid or its described equivalent is mixed with calcium carbid and heated, when a double reaction occurs, the calcium finally taking the fluorin, producing calcium fluorid, and the carbon of the carbid taking up or combining with the oxygen, producing carbonic oxid thus:

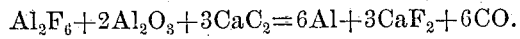

This mixture of aluminium oxid and fluorid with calcium carbid may be intimately mixed and heated alone or added or introduced into a chemically inert molten bath, such as calcium and alkali fluorids in the case of aluminium reduction, the oxid and fluorid when heated forming a so-called "oxyfluorid" and the metallic carbid reducing the metallic base therefrom by the combined action of its elements—*i. e.,* the metallic base of the carbid absorbing or combining with the fluorin and the carbon thereof combining with the oxygen.

Alloys may be produced by employing a mixture of oxid and fluorid of two or more metals—as, for example, the production of aluminium-copper alloy I mix copper oxid and aluminium fluorid and heat the same in a proper container with $CaC_2$, when the elements of the carbid absorb and combine with the electronegative elements of the copper and aluminium compounds, leaving said metals in a free state in the form of alloy and transforming the calcium carbid into calcium fluorid and carbonic oxid, thus utilizing the carbid wholly as a reducing agent, the metallic base absorbing the fluorin and the combined carbon the oxygen, reducing the copper and aluminium to a metallic state and utilizing the whole of the heat liberated from transformation of carbid. It can therefore be readily seen that my process consists in reducing metals with metallic carbid in such a manner that the electronegative elements of the compounds to be reduced have greater affinity for both elements of the carbid than the metals with which they are combined, thus utilizing the combined reducing power of the elements of the metallic carbid and the entire heat of its combination within the mass, thereby performing perfect reduction at lower external or applied temperatures—*i. e.,* the carbids being endothermic compounds absorbing an excess of heat on formation, therefore liberating it on decomposition, whereby it is immediately utilized in the mixture.

It is obvious that any practical metallic carbid may be employed as reducing agent and any metallic compound to be reduced so long as the combined elements of the carbid have greater affinity for the electronegative elements of the compound or composition to be reduced.

Instead of an oxyfluorid I can employ an oxychlorid or other oxyhaloid or any metallic compound containing oxygen and another non-metallic element in combination or a mixture of an oxid with other binary salt which may be considered a described equivalent from a reducing standpoint—*i. e.,* the metal from which is reduced by the action of combined elements of the carbid.

The terms "oxyfluorid" and "oxyhaloid" as herein employed are intended to describe a composition containing oxygen and fluorin or haloid element combined with metal and is intended to include mixtures of metallic oxid and haloid salts as equivalents thereof, as well as actual chemical compounds *per se*, and the term "metallic carbid" relates to compositions of carbon with ordinarily solid or liquid metal.

Having now described my invention, what I claim, and desire to secure by Letters Patent, is—

1. The process of reducing metals, which consists in exposing a composition therefor to be reduced containing metal and two or more non-metallic elements to the action of heat and a metallic carbid the combined elements of which are capable of combining with the electronegative constituents of the compound, substantially as described.

2. The process of reducing metals, which consists in exposing a metallic oxyhaloid compound to the action of heat and a metallic carbid, the combined elements of which are capable of uniting with the electronegative constituents of the material to be reduced.

3. The process of reducing metals, which consists in exposing a metallic oxyfluorid to the action of heat and a metallic carbid the combined elements of which are capable of abstracting the oxygen and fluorin.

4. The process of reducing metals and producing alloys thereof which consists in heating a mixture containing two or more metals combined with oxygen and haloid element, with a metallic carbid the combined elements of which are capable of abstracting the oxygen and haloid elements thereby liberating the metals and producing alloys thereof.

5. The process of reducing aluminium which consists in exposing aluminium oxyfluorid to the action of heat and a metallic carbid, the combined elements of which will unite with the oxygen and fluorin.

6. The process of reducing aluminium, which consists in exposing aluminium oxyfluorid to the action of calcium carbid and heat.

7. The process of reducing aluminium, which consists in introducing into an inert molten bath a mixture of aluminium oxyfluorid and a metallic carbid, the combined elements of which are capable of extracting the oxygen and fluorin.

8. The process of reducing metals, which consists in exposing a compound to be reduced containing a metal and two or more non-metallic elements to the action of heat and a metallic carbid the combined elements of which are capable of combining with the electronegative constituents of the compound.

9. The process of reducing metals which consists in exposing at a reacting temperature a composition containing metal and two or more non-metallic elements to the action of a carbid the combined elements of which are capable of combining with the electronegative elements of the composition.

10. The process of reducing aluminium which consists in extracting aluminium from a compound thereof containing associated elements capable of uniting with the combined elements of a carbid, by exposing said compound at a reacting temperature to the action of a carbid.

In testimony whereof I affix my signature in presence of two witnesses.

HENRY SPENCER BLACKMORE.

Witnesses:
D. W. GARDNER,
HARRY R. KING.